Patented Feb. 13, 1923.

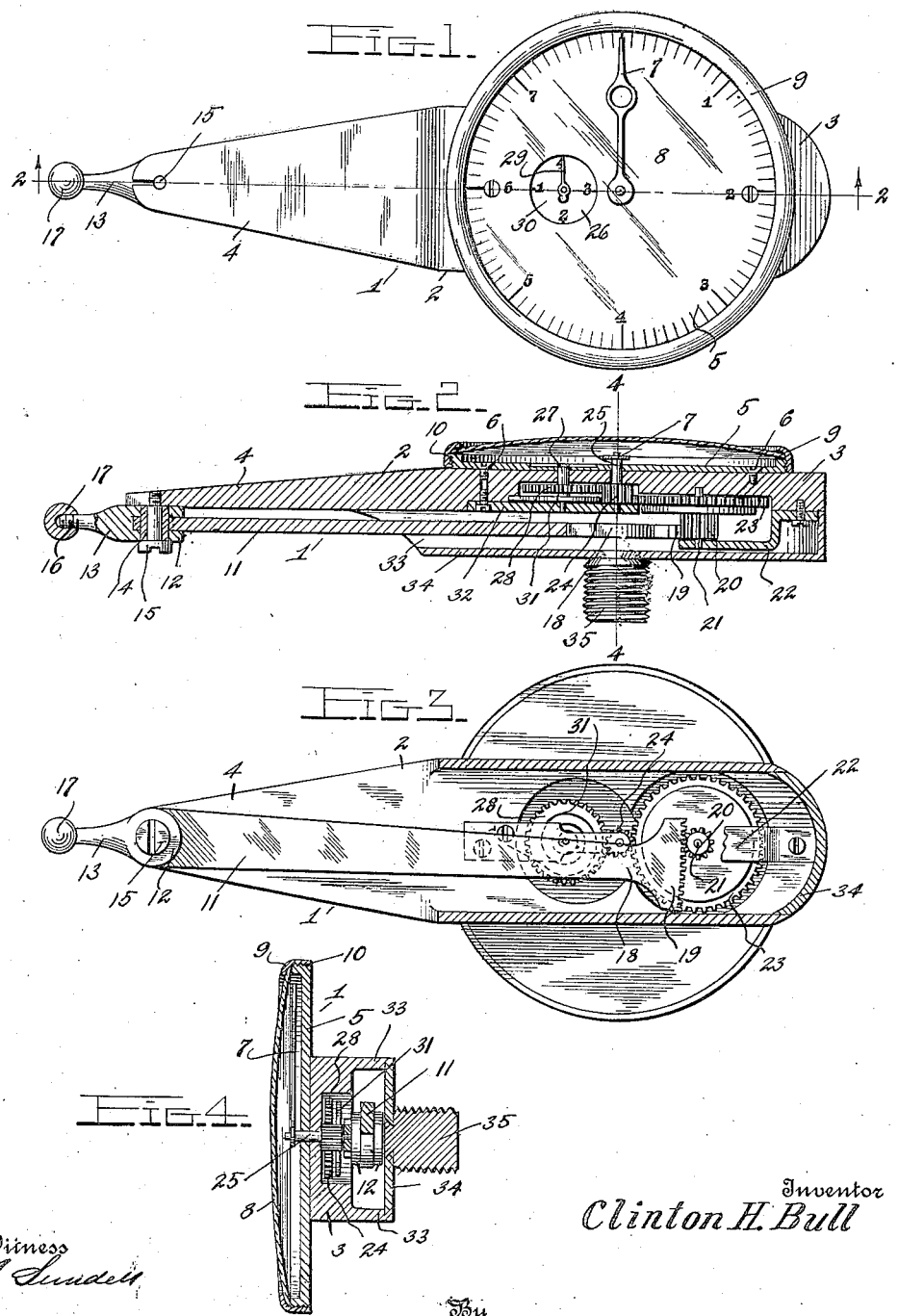

1,445,482

UNITED STATES PATENT OFFICE.

CLINTON H. BULL, OF COLUMBUS, OHIO.

TEST INDICATOR.

Application filed March 24, 1920, Serial No. 368,207. Renewed January 8, 1923.

*To all whom it may concern:*

Be it known that CLINTON H. BULL, a citizen of the United States, residing at Columbus, in the county of Franklin and State of Ohio, has invented certain new and useful Improvements in Test Indicators, of which the following is a specification.

This invention relates to test indicators of the type employed by machinists, or others, for the purpose of quickly and easily effecting refinements in measurements incident to metal machining and other analogous operations, the primary object of the invention being to provide a compact, mechanically correct and reliable instrument wherein features of construction are provided which render the instrument capable of registering measurements as fine as 1/10,000 of an inch or other desired multiples thereof.

The invention consists essentially in the provision of a portable test indicator wherein is provided a dial body upon which is mounted a pivoted arm or lever whose fulcrum is so arranged that but relatively slight movement on the part of the actuating end thereof will be sufficient to create a much larger movement of its motion transmitting end, said latter end being formed, preferably, with gear teeth capable of meshing with a movement amplifying gear train of peculiar arrangement, the construction being such that through the agency of the fulcrumed arm and the co-operative gear construction, the movement of the indicator hand of the device over a calibrated dial will be sufficient to visually and clearly denote the exceedingly minute deflections on the part of the operating end of said arm.

The invention further consists in constructing the actuating mechanism of the indicator in such manner that when the operating arm or lever has been oscillated to its fullest extent from its normal position the indicator hand will be completely rotated several times so that the range of measurement on the part of the indicator will be materially increased, and to provide means in combination with the actuating mechanism for enabling an operator to denote the number of revolutions on the part of the indicator hand for each given operation, this construction being particularly desirable in that when the actuating mechanism is quickly operated, the indicator hand will rotate with such speed that its movement can not be readily detected by the eye, therefore through the provision of the revolution denoting means, the operator will be accurately informed as to the extent of deflection of the indicator hand from its normal or zero position.

Another object of the invention resides in equipping the operating shaft or an equivalent part of the revolution denoting means with a spiral or hair spring structure, which is so arranged as to return the actuating mechanism and the indicator hand to normal positions, the position of the spring structure with relation to the actuating mechanism being such that said structure will be protected from the strains and stresses imparted to said mechanism.

With these and other objects in view, as will appear as the description proceeds, the invention further consists in the novel features of construction, combinations of elements and arrangement of parts, to be hereinafter fully described and to have the scope thereof pointed out in the appended claims.

In the accompanying drawing, forming a part of the specification, and in which similar characters of reference denote like and corresponding parts throughout the several views thereof:

Figure 1 is a front elevation of the test indicator comprising the present invention, Figure 2 is a sectional view taken through the indicator on the line 2—2 of Figure 1, Figure 3 is a longitudinal sectional view taken through the indicator and illustrating more particularly the actuating mechanism thereof, and Figure 4 is a transverse sectional view taken through the indicator on the line 4—4 of Figure 2.

Referring more particularly to the embodiment of the invention as disclosed in the drawing, the numeral 1 designate my improved indicator in its entirety. As shown, the latter consists of a suitably formed body 2, which is preferably of metallic construction and comprises a base portion 3 and a forward extension 4. The outer face of the base portion 3 is, in this instance, equipped with a dial ring 5, which is secured to the base portion in any suitable manner, for example by means of screws 6. As shown, the face of the ring 5 is suitably calibrated to denote 1/10,000 of an inch and over which the rotatable indicating finger or hand 7 is adapted to travel. Preferably, the dial construction is covered by means of a crystal 8, which is secured in position by means of a removable annulus 9, the latter being threaded as at 10 to the outer wall of the ring 5. Obviously, through the provision of the crystal 8 the hand 7 will be protected from the effects of the rough usage incident to actual use.

To effect the rotation of the hand 7, use is made of an actuating mechanism which is formed to include a pivoted operating lever or arm 11. This member is so disposed as to extend parallel the longitudinal width of the rear face of the body 2. In this instance, the forward end of the lever 11 is arranged to be firmly received by a driving fit between a pair of bifurcated arms 12 provided upon an actuating member 13, the relation between the forward end of the lever 11 and the member 13 being such that the movement of one will impart corresponding and similar movement to the other, or in other words the parts 11 and 13 are in effect one part. As shown, the arms 12 and the outer end of the lever or arm 11 are provided with registering openings in which a common bushing 14 is positioned, and a screw 15 rigidly carried by the outer end of the extension 4 is arranged to be positioned within said bushing and to constitute a fulcrum for the operating lever. By the provision of the bushing 14, undue wear upon the screw 15 is eliminated and hence the oscillation of the lever 11 is rendered true and accurate. The outer end of the member 13 is reduced and threaded as at 16 for the reception of an adjustable case hardened ball element 17, which is so positioned as to engage the work upon which the indicator is used, and in this manner to effect the oscillation of the actuating lever. By rendering the element 17 adjustable slight irregularities in proportion between the actuating mechanism and the indicator hand 7 may be compensated for, inasmuch as the adjustment of the element 17 will partially regulate the extent of movement of the motion transmitting portion 18 of the lever. Manifestly, owing to the position of the fulcrum 15 with respect to the length of the lever 11, relatively slight movement on the part of the actuating end 13 will be sufficient to impart considerably amplified movement to the motion imparting end 18.

To further amplify this movement and to transmit the same to the hand 7, the portion or end 18 of the lever 11 is provided with segmental gear teeth 19. These teeth are so disposed as to mesh with a pinion 20 which is fixed to an idler shaft 21, the latter having its ends journaled in the body 2 and also in a bracket 22 carried by the rear face of said body. The teeth of the segment 19 and those of the pinion 20 bear such numerical relation that when the lever 11 has been fully oscillated for any given operation, the shaft 21 will be caused to effect substantially a complete revolution. The inner end of the shaft 21 carries a large idler gear 23 which meshes with a reduced pinion 24 fixed to the operating shaft 25 of the hand 7, and it will be observed that the teeth of the pinion 24 are approximately one-fourth the number of those found upon the gear 23. Therefore, it follows that when the lever 11 has been fully oscillated in a given direction the idler shaft 21 will be caused to effect a complete revolution and will thereby impart its motion to the gear 23, the latter, in turn, being substantially four times the size of the pinion 24, will cause the latter to effect substantially four complete revolutions around the dial face 5 upon complete oscillation on the part of the actuating lever. In other words, when fully rotated the hand 7 will be capable of registering deflections on the part of the actuating end 13 from its normal position of, in this instance, 320/10,000 of an inch, or when slightly rotated said hand will be capable of registering 1/10,000 part of an inch.

It will thus be manifest that the indicator comprising the present invention is fully capable of registering very fine and minute measurements and provides a tool for greatly facilitating and promoting fine and accurate workmanship. The actuating mechanism is of simple yet efficient construction and is fully capable of amplifying the movements of the actuating lever to enable the same to be visually denoted in a clear and unmistakable manner by reference to the dial structure. The present invention, of course, is not directed broadly to a test indicator but consists in improving such indicators so that the same may be employed to effect much finer readings. Many commercial indicators having a capacity for permitting of the registering of 1/1,000 part of an inch, but none to the best of my knowledge have been successfully perfected, prior to the introduction of the present invention, to permit of the registration of 1/10,000 part of an inch. The general construction of the indicator 1 is such as to render the same light, compact and portable and to be capable of being easily manipulated so as to be adapted to the requirements of the work at hand. Another feature is the location of the dial structure, which is positioned to the front of the indicator, and hence is readily capable of being viewed by the operator at all times during its use and without causing the operator to assume awkward positions to obtain a view of its readings.

Owing to the construction of the lever 11 and the associated gear train, it will be manifest that slight movements on the part of the end 13 when suddenly or quickly applied will cause the hand 7 to quickly rotate. In fact, this motion is so rapid that it is practically impossible for the eye to detect or follow the same. It is only when the end 13 is very slowly and carefully moved from its normal position that the movements of the hand 7 may be watched. From this, it will be apparent that unless the operator uses extreme caution he will not know whether or not the hand 7 has completed one or more revolutions, and in past devices this fact has caused the operator to repeatedly effect measuring operations in order to be positively informed as to the extent of deflection of the hand 7 from its normal or zero position. Therefore, the present invention includes the provision of hand revolution denoting mechanism 26 which is cooperative with the hand 7 to disclose the true position which the latter may occupy in deflection from its normal position. To this end, use is made of a second idler shaft 27 which is positioned in parallelism with the shaft 25 and is provided with a fixed gear 28, the latter being disposed to mesh with the teeth of the pinion 24 formed upon the hand shaft. The gear reduction between the pinion 24 and the gear 28 is such that the idler shaft 27 will effect one complete revolution upon every four complete revolutions of the hand shaft. Therefore, by providing the upper end of the shaft 27 with an indicating finger 29, which is movable over a small registering dial 30, the number of rotations on the part of the hand 7 may be instantly and reliably ascertained by reference to the finger 9 and denoting the position of the latter upon its dial. The provision of the revolution denoting mechanism 26 furnishes, it is believed, one of the major features of the present invention and is believed to constitute a distinct improvement in the art. Its inclusion greatly facilitates indicator readings and eliminates the necessity of repeated adjustments hitherto necessary to denote the positions of an indicator hand which the latter may assume in deflection from its normal position.

Another important feature of the present invention resides in equipping the shaft 27 with a hair or spiral spring 31, one end of said spring being secured to the shaft 27, or an equivalent element, while the opposite end thereof is suitably and rigidly connected with the indicator body. It will be manifest that the normal tendency exercised by the spring 31 will be to return the actuating mechanism of the indicator, and consequently the hand 7, to normal positions and in this respect the same operates after the fashion of similar devices of the prior art. However, the important factor entering into the use of the spring 31 is the position which the latter assumes in the indicator. It will be noted that said spring is employed in conjunction with the idler shaft 27 and hence even when the hand shaft 25 has been rotated four complete revolutions, the tension upon the spring 31 will only be increased to an amount equivalent to but one complete revolution on the part of the idler shaft 27, and therefore the operative condition of the spring 31 will be maintained even after considerable periods of usage. Furthermore, the same will not be subjected to such strains that are incident to undue shocks and blows which may be imparted to the operating end of the lever 11. Past structures usually apply the spring directly to the operating levers thereof, thereby causing the spring to receive fully whatever jolts and jars are imparted to a co-operative lever. In the present invention the spring is securely protected, and the same is only called upon to function strongly when the operating lever has been moved to its greatest extent.

The gear train of the actuating mechanism is preferably located within adjoining circular recesses formed in the rear face of the indicator body, and the arrangement of the different gears comprising the train is such as to insure compactness and yet to maintain the desired amplification of movement. A shelf 32 is suitably fixed to the body and is arranged to act as a support for the rear ends of the shafts 25 and 27. It will be noted that the operating lever or arm 11 is positioned between a pair of rearwardly projecting ribs 33 integrally formed with the body 2. These ribs are spaced apart a distance which will regulate the throw of the motion imparting end of the lever 11, and hence the movement of the actuating mechanism as a whole will be regulated and arrested by the contacting of the portion 18 with the inner surfaces of the ribs 33. This feature serves to regulate the extent of movement of the indicating hand 7 and also acts to safeguard the spring 31, in that by arresting the movement of the actuating lever, said spring will be prevented from being wound too tautly. The ribs 33 also carry a sliding cover plate 34, see Figure 4, from which projects a rigid threaded stud 35, the latter being employed to mount the indicator in its operative position and to permit the same to be readily associated with the work at hand.

While the foregoing description specifically sets forth what is now believed to be the best mode of applying the principles of the invention, yet it should be understood that the description does not necessarily measure the invention except as the latter is defined in the following claims.

What is claimed is:

1. A test indicator comprising a body having a dial face formed therewith, an indicator hand movable over said dial face, an operating lever pivoted at one end to said body, segmental gear teeth provided upon one end of said lever, an idler pinion in mesh with said gear teeth, an idler gear rotatable with said pinion, a shaft upon which said indicator hand is mounted, a second pinion fixed to said shaft and in mesh with said idler gear, said gearing serving to amplify the hand rotating motion of said lever, a countershaft, a revolution denoting hand carried by said countershaft, a gear fixed to said countershaft and in mesh with said hand shaft pinion, and a hair spring cooperative with said countershaft and normally serving to return the parts of the indicator to normal positions.

2. In a test indicator, a body, an actuating lever pivotally mounted upon said body, said lever being formed to include a bifurcated actuating end and a rigidly associated motion transmitting portion, a bushing extending through openings formed in the elements of said lever, a pin carried by said body and about which said bushing rotates, an indicator hand, a gearing between said hand and the motion transmitting portion of said lever.

3. A test indicator comprising a body having a dial face formed therewith, an indicator hand rotatable over said dial face, an operating lever pivoted to one end of said body, gear teeth provided upon one end of said lever, an idler pinion in mesh with said gear teeth, an idler gear rotatable with said pinion, a shaft upon which said indicator hand is mounted, a second pinion fixed to said shaft and in mesh with said idler gear, a counter shaft, a gear fixed to said counter shaft and in mesh with said hand shaft pinion, and a hair spring cooperative with said counter shaft normally serving to maintain the parts of the indicator in normal positions.

In testimony whereof I affix my signature.

CLINTON H. BULL.